UNITED STATES PATENT OFFICE.

HIRAM PRUDEN, OF ERIE, PENNSYLVANIA.

IMPROVEMENT IN MEDICAL COMPOUNDS FOR DIPHTHERIA, &c.

Specification forming part of Letters Patent No. 140,163, dated June 24, 1873; application filed November 22, 1872.

*To all whom it may concern:*

Be it known that I, HIRAM PRUDEN, of Erie, in the county of Erie and State of Pennsylvania, have invented a certain Compound called "Prudent Oil," to be used as a medicine, of which the following is a specification:

The nature of my invention consists in mixing with petroleum oil a sufficient quantity of spirits turpentine, and as much camphor-gum as will be cut or dissolved; said mixture, when prepared, to be used as a medicine for the cure of diphtheria and other throat affections, and also for rheumatic affections.

To prepare my prudent oil take a quantity of properly-refined petroleum oil—say one quart. To this add about two ounces of spirits turpentine, and then add such a quantity of gum-camphor as will be cut by the mixture.

The mixture, when thus prepared, can be bottled and kept for use. It is to be used as a wash or liniment for the part affected. It is applied to the throat as a wash or liniment both externally and internally. This mixture will also be found beneficial when applied to burns or bruises.

I claim as my invention—

A compound composed of refined petroleum oil, spirits turpentine, and camphor, substantially in the proportions and for the purposes set forth.

HIRAM PRUDEN.

Witnesses:
JNO. K. HALLOCK,
JEROME F. DOWNING.